(12) United States Patent
Yokoyama et al.

(10) Patent No.: US 7,651,426 B2
(45) Date of Patent: Jan. 26, 2010

(54) DIFFERENTIAL TORQUE GENERATOR

(75) Inventors: Atsushi Yokoyama, Yamato (JP);
Makoto Yamakado, Tsuchiura (JP);
Tatsuyuki Yamamoto, Mito (JP)

(73) Assignee: Hitachi, Ltd., Tokyo (JP)

( * ) Notice: Subject to any disclaimer, the term of this patent is extended or adjusted under 35 U.S.C. 154(b) by 373 days.

(21) Appl. No.: 11/599,437

(22) Filed: Nov. 15, 2006

(65) Prior Publication Data
US 2007/0123383 A1    May 31, 2007

(30) Foreign Application Priority Data
Nov. 16, 2005    (JP)    ............................. 2005-331030

(51) Int. Cl.
*B62D 11/06*    (2006.01)
(52) U.S. Cl. ........................................................ 475/19
(58) Field of Classification Search .................. None
See application file for complete search history.

(56) References Cited
U.S. PATENT DOCUMENTS
6,098,737 A    8/2000    Aoki 7,311,631 B2 *    12/2007    Kushino .................... 475/221

FOREIGN PATENT DOCUMENTS

| DE | 43 06 381 A1 | 11/1993 |
|----|--------------|---------|
| FR | 2 844 858 | 3/2004 |
| JP | 06-300096 | 10/1994 |
| JP | 2005-351471 | 12/2005 |

OTHER PUBLICATIONS

European Search Report dated Mar. 5, 2007 (ten (10) pages).

* cited by examiner

*Primary Examiner*—Dirk Wright
(74) *Attorney, Agent, or Firm*—Crowell & Moring LLP

(57) ABSTRACT

A first common rotational axis of first and second shafts of a first differential is prevented from being coaxial with a second common rotational axis of first and second rotary members of a second differential so that each of the first and second shafts is prevented from extending through at least one of the first and second rotary members.

7 Claims, 4 Drawing Sheets

DIFFERENTIAL TORQUE GENERATOR

BACKGROUND OF THE INVENTION

The present invention relates to a differential torque generator between axles for applying torques to the axles respectively with a single torque generating source in a connecting device connecting the axles of vehicle to each other, magnitudes of which torques are equal to each other and directions of which torques (counter torque) are opposite to each other.

Conventionally, a counter torque mechanism for generating a counter torque between vehicle wheels of a pair from a torque of a motor is known. A counter torque mechanism disclosed by JP-A-6-300096 has first and second planetary gear drives of the identical function, and first and second planetary carriers are connected to respective differential output elements of a pair. First and second sun gears are formed in one-piece, and a first ring gear is connected to a hydraulic motor while a second ring gear is fixed to a casing. When the first ring gear is driven by the hydraulic motor to turn the vehicle, a differential motion is generated between the first and second planetary carriers to generate the counter torque between right and left vehicle wheels. A pair of the planetary gear drives of the identical gear ratio is used to miniaturize radially the counter torque mechanism, to decrease its weight and to expand a range for design choice.

BRIEF SUMMARY OF THE INVENTION

Since the first and second planetary carriers rotate at a speed equal to a rotational speed of the vehicle wheels in the conventional counter torque mechanism, a torque equal to the torque to be generated on the axles is transmitted to the counter torque mechanism to cause a problem of that a size of the mechanism is increased to have a sufficient strength. Further in the conventional counter torque mechanism, the output elements of the pair for a differential mechanism are connected to each other. In a well known differential mechanism of bevel gear type for constituting it, input elements arranged between the two output element makes an interconnection between the output elements of the pair difficult. Therefore, the differential mechanism of planetary gear type is used to prevent the interconnection between the output elements from being made difficult by the input elements, but since a structure of the differential mechanism of planetary gear type is complicated, a problem of that a size of the mechanism is increased occurs.

An object of the present invention is to provide a torque generator between axles with a small size and a wide range for design choice.

In a differential torque generator for generating a difference in magnitude between a first torque to be applied to a first vehicle wheel and a second torque to be applied to a second vehicle wheel when a vehicle is driven by a motor with rotations of the first and second vehicle wheels, comprising:

a main differential including a first shaft to be rotationally connected to the first vehicle wheel, and a second shaft to be rotationally connected to the second vehicle wheel, wherein the first and second shafts are capable of rotating coaxially with respect to each other to allow a difference in rotational speed between the first and second shafts, and a supplemental differential including a first rotary member rotationally connected to the first shaft, a second rotary member rotationally connected to the second shaft and rotatable coaxially with respect to the first rotary member to allow a difference in rotational speed between the first and second rotary members, and a supplemental motor for generating a supplemental torque to cause the difference in rotational speed between the first and second rotary members in accordance with an output rotation of the supplemental motor, and to apply to the first and second rotary members respective parts of the supplemental torque opposite in direction to each other to generate the difference in magnitude between the first and second torques through the first and second rotary members and the first and second shafts, according to the invention, a first common rotational axis of the first and second shafts is prevented from being coaxial with a second common rotational axis of the first and second rotary members so that each of the first and second shafts is prevented from extending through at least one of the first and second rotary members (in a direction parallel to at least one of the first and second common rotational axes). The first and second common rotational axes are preferably parallel to each other.

Therefore, the first and second rotary members do not need to be greater in diameter than the first and second shafts, so that the first and second rotary members can have respective optimum diameter to decrease a size of the supplemental differential so that a torque generator between axles with a small size can be provided.

In the differential torque generator, it is preferable for the supplemental differential to include a casing on which the first and second rotary members are supported in a rotatable manner, and a pair of planetary gear trains which are coaxial with respect to each other and each of which has a sun gear, a planet gear carrier holding thereon at least one planet gear in a rotatable manner and a ring gear to form a first pair of the sun gears as planet elements, a second pair of the planet gear carriers as the planet elements and a third pair of the ring gears as the planet elements, the planet elements of one of the first, second and third pairs are fixed rotationally with respect to each other, one of the planet members of the other one of the first, second and third pairs is connected to the first rotary member to rotate synchronously with the first rotary member, the other one of the planet members of the other one of the first, second and third pairs is connected to the second rotary member to rotate synchronously with the second rotary member, one of the planet members of the further other one of the first, second and third pairs is prevented from rotating on the casing, and the other one of the planet members of the further other one of the first, second and third pairs is capable of being rotationally connected to the supplemental motor to be rotationally driven by the supplemental torque. On the other hand, the supplemental differential may includes a pair of Harmonic Drives® constituting the differential and each including a wave generator corresponding to the sun gear, a flexspline corresponding to the planetary carrier and a circular spline corresponding to the ring.

If the supplemental differential includes a third rotary member rotationally connected to one of the first and second rotary members, and a clutch for selectively connecting rotationally the supplemental motor to one of the third rotary member and the other one of the planet members of the further other one of the first, second and third pairs while releasing rotationally the supplemental motor from the other one of the third rotary member and the other one of the planet members of the further other one of the first, second and third pairs, the supplemental torque generated by the supplemental motor is used to rotationally drive evenly the first and second shafts when the clutch connects rotationally the supplemental motor to the third rotary member while releasing rotationally the supplemental motor from the other one of the planet members of the further other one of the first, second and third pairs, and to generate the difference in magnitude between the first and second torque when the clutch connects rotationally the supplemental motor to the other one of the planet members of the further other one of the first, second and third pairs while releasing rotationally the supplemental motor from the other one of the third rotary member.

It is preferable for decreasing a torque transmitted by the supplemental differential to further miniaturize the supplemental differential that the first rotary member and the first shaft are rotationally connected to each other in such a manner that a rotational speed of the first rotary member is higher than a rotational speed of the first shaft when the first rotary member and the first shaft rotate synchronously with respect to each other, and the second rotary member and the second shaft are rotationally connected to each other in such a manner that a rotational speed of the second rotary member is higher than a rotational speed of the second shaft when the second rotary member and the second shaft rotate synchronously with respect to each other.

It is preferable for simplify a structure of the main differential to miniaturize the main differential that the main differential includes a common rotary member rotationally connected to the motor and each of the first and second shafts so that a torque generated by the motor is distributed through the common rotary member between the first and second shafts to move the vehicle, and the first rotary member is rotationally connected to the common rotary member so that one of the parts of supplemental torque is distributed through the common rotary member between the first and second shafts. It is preferable for decreasing a torque transmitted by the supplemental differential to further miniaturize the supplemental differential that the first rotary member and the common rotary member are rotationally connected to each other in such a manner that a rotational speed of the first rotary member is higher than a rotational speed of the common rotary member when the first rotary member and the common rotary member rotate synchronously with respect to each other, and the second rotary member and the second shaft are rotationally connected to each other in such a manner that a rotational speed of the second rotary member is higher than a rotational speed of the second shaft when the second rotary member and the second shaft rotate synchronously with respect to each other.

Other objects, features and advantages of the invention will become apparent from the following description of the embodiments of the invention taken in conjunction with the accompanying drawings.

DETAILED DESCRIPTION OF THE INVENTION

Embodiments of the invention will be described below with making reference to the drawings.

Embodiment 1

Figure 1:
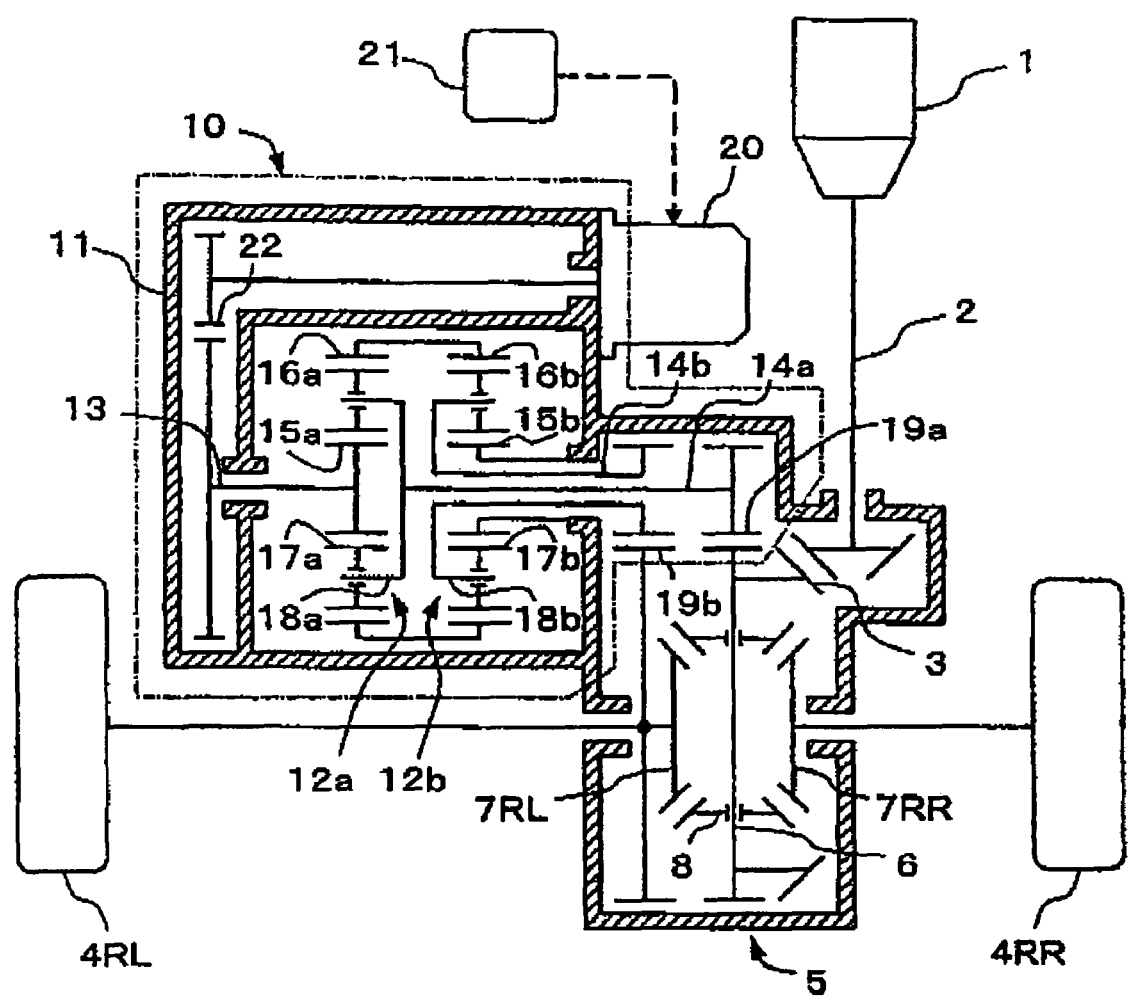
FIG. 1 is a view showing a torque generator between axles as a first embodiment of the invention.

FIG. 1 is a structure of a torque generating device between axles as a first embodiment of the invention.

It is an example in which a torque generating device between axles of the invention is applied to a vehicle whose rear wheels are driven by an engine 1. A drive shaft 2 is connected to a left rear wheel 4RL and a right rear wheel 4RR through a final gear 3 and a differential mechanism 5. The final gear 3 bends a rotating direction of the drive shaft 2 by 90 degrees and decrease a rotational speed of the drive shaft 2 at a predetermined reduction gear ratio.

The differential mechanism 5 is constituted by a differential input element 6 rotating synchronously with the final gear 3, a pair of left and right bevel side gears 7RL and 7RR, and a pinion gear 8 engaging with both of the side gears 7RL and 7RR, the side gears 7RL and 7RR and the pinion gear 8 are supported on the differential input element 6 in a rotatable manner, and a rotational axis of the pinion gear 8 is perpendicular to a rotational axis of the side gears 7RL and 7RR. The left side gear 7RL is connected to a left vehicle wheel 4RL, and the right side gear 7RR is connected to a right vehicle wheel 4RR. An average rotational speed between the side gears 7RL and 7RR is equal to a rotational speed of the differential input element 6, and the rotational speed of the differential input element 6 is equal to the rotational speeds of the side gears 7RL and 7RR when the rotational speeds of the side gears 7RL and 7RR are equal to each other. Each of the side gears 7RL and 7RR rotates with the same rotational speed with respective one of the wheels, and the differential input element 6 is made rotate by the differential mechanism at the average speed of the wheels of the pair.

A counter torque mechanism 10 has a housing 11 fixed to a vehicle body, a pair of planetary gear mechanisms 12a and 12b having respective rotary elements with the identical reduction gear ratio, an input shaft 13 for the counter torque, and a pair of output shafts 14a and 14b. The first planetary gear mechanism 12a is constituted by a first sun gear 15a, a first ring gear 16a, first planetary gears 17a and a first planetary carrier 18a, and the first planetary carrier 18a supports the first planetary gears 17a engaging with the first sun gear 15a and the first ring gear 16a. The second planetary gear mechanism is constituted by a second sun gear 15b, a second ring gear 16b, second planetary gears 17b and a second planetary carrier 18b, and the second planetary carrier 18b supports the second planetary gears 17b engaging with the second sun gear 15b and the second ring gear 16b. A number of teeth of the sun gears 15a and 15b is Zs, and a number of teeth of the ring gears 16a and 16b is Zr.

The first sun gear 15a is connected to the counter torque drive motor 20 as the torque generating source through the reduction gear mechanism 22, and the second sun gear 15b is fixed to the housing 11 to be prevented from rotating. The first ring gear 16a and the second ring gear 16b are rotatable on the housing 11, but connected to each other to be prevented from rotating with respect to each other. The first planetary carrier 18a is connected to the differential input element 6 through the first output shaft 14a and the first reduction gear mechanism 19a. A rotation of the first output shaft 14a is transmitted to the differential input element 6 through the first reduction gear mechanism 19a with a reduction gear ratio 1/N to decrease the rotational speed by 1/N time. The second planetary carrier 18b is connected to the left wheel side gear 7RL through the second output shaft 14b and the second reduction gear mechanism 19b. A rotation of the second output shaft 14b is transmitted to the left wheel side gear 7RL through the second reduction gear mechanism 19a with a reduction gear ratio 1/N to decrease the rotational speed by 1/N time.

Each of the reduction gear mechanism 14a and the reduction gear mechanism 14b is constituted by two rotary elements having respective rotational axes different from each other. Therefore, the first planetary gear mechanism 12*a* and the differential input element 6 are arranged on respective rotational axes different from each other, and the planetary gear mechanism 12*b* and the left wheel side gear 7RL are arranged on respective rotational axes different from each other. A problem is caused by an layout enabling the axles to extend through the planetary gear mechanisms 12*a* and 12*b* if the planetary gear mechanisms 12*a* and 12*b* and the left wheel side gear 7RL are arranged coaxially, but if the planetary gear mechanisms and the axles are arranged on the respective axes different from each other, this problem can be escaped to improve a range for design choice to provide a compact differential torque generator between the axles.

Further, as shown in FIG. 1, an input shaft of the counter torque drive motor 20 is connected to a left side of the counter torque mechanism 10, and the two output shafts 14*a* and 14*b* are connected to the right sides of the differential input element 6 and the side gear 7RL. That is, a direction in which the counter torque generating source is connected and a direction in which the first axle and the second axle are connected are different from each other. Therefore, a direction in which the torque is transmitted is single so that the counter torque drive motor 20, the counter torque mechanism 10, the differential mechanism 5 and the wheels 4RL and 4RR are arranged in order of the torque transmission. Therefore, the compact differential torque generator between the axles can be provided by simplifying the layout of the mechanism elements in comparison with a case in which the connecting direction for the two output shafts 14*a* and 14*b* are different from each other.

The counter torque controller 21 as the drive controller is electrically connected to the counter torque drive motor 20 to calculate a necessary counter torque for driving the counter torque drive motor 20 on the basis of running condition signals from a vehicle running condition detector not shown. The running condition signals are signals showing an running operation degree such as a handle steering angle, an accelerator opening degree or the like, a vehicle running condition degree such as vehicle speed, wheel speed, yaw rate, side skid angle or the like and an external environmental condition degree such as frictional coefficient of road surface, gradient of road surface or the like.

Next, an operation of the first embodiment of the invention will be described.

At first, a relationship in rotational speed and transmitted torque between the input shaft 13 and each of the output shafts 14*a* and 14*b* and a mechanism for transmitting a drive torque of the counter torque drive motor 20 as the counter torque to the left wheel 4RL and the right wheel 4RR. When the second output shaft 14*b* and the second planetary carrier 18*b* rotate at speed $\omega b$, a rotational speed of the ring gears 16*a* and 16*b* is $(Zr+Zs)/Zr\times\omega b$ because the second sun gear 15*b* is fixed to the housing 11. When the first output shaft 14*a* and the first planetary carrier 18*a* rotate at speed $\omega a$ and the first ring gear rotates at $(Zr+Zs)/Zr\times\omega b$, a rotational speed $\omega i$ of the first sun gear and the input shaft 13 is $(Zr+Zs)/Zs\times(\omega a-\omega b)$. Therefore, when a difference in rotational speed between the first output shaft and the second output shaft is $\Delta\omega(\omega a-\omega b)$, the rotational speed $\omega i$ of the input shaft 13 is $(Zr+Zs)/Zs\times\Delta\omega$.

Therefore, the rotational speed $\omega i$ of the input shaft does not depend on the rotational speed $\omega a$ of the first output shaft and the rotational speed $\omega b$ of the first output shaft but depends on $\Delta\omega$ of the difference in rotational speed between the first output shaft and the second output shaft. In other words, when the rotation of the input shaft 13 is set by the counter torque drive motor 20 at the speed $\omega i$, the rotational speed $\omega a$ of the first output shaft and the rotational speed $\omega b$ of the first output shaft, that is, a speed of the vehicle does not need to be determined, but the difference $\Delta\omega$ in rotational speed between the first output shaft and the second output shaft is determined. Further, when an input torque Ti is applied by the counter torque drive motor 20 to the input shaft 13, the first output shaft 14*a* outputs a first output torque Ta of $\{(Zr+Zs)/Zs\times Ti\}$. On the other hand, the second output shaft 14*b* outputs a second output torque Tb of $\{-(Zr+Zs)/Zs\times Ti\}$ equal in value to that of the first output shaft 14*a* and opposite in direction to that of the first output shaft 14*a*. The counter torque is generated between the first output shaft 14*a* and the second output shaft 14*b*

The torque of the first output shaft 14*a* is amplified by N times with the first reduction gear mechanism 19*a* to be transmitted to the differential input element 6. The torque from the differential input element 6 is distributed evenly by the differential mechanism between the left and right wheels 4RL and 4RR so that a torque of $(Zr+Zs)/Zs/2\times N\times Ti$ is transmitted to each of the left wheel 4RL and the right wheel 4RR. On the other hand, the torque of the second output shaft 14*b* is amplified by N times with the second reduction gear mechanism 19*b* so that a torque of $\{-(Zr+Zs)/Zs\times N\times Ti\}$ is transmitted to the left wheel 4RL. Therefore, the torque generated on the left wheel 4RL by the counter torque mechanism 10 is $-(Zr+Zs)/Zs/2\times N\times Ti$ as a sum of the torques transmitted from the first output shaft 14*a* and the second output shaft 14*b*. That is, when the input torque Ti is applied to the input shaft 13, the counter torques (equal in value to each other and opposite in direction to each other)$\pm(Zr+Zs)/Zs/2\times N\times Ti$ are generated on the left and right wheels 4RL and 4RR.

As described above, since the torque is amplified by the reduction gear mechanisms 19*a* and 19*b*, the torque to be transmitted by the counter torque mechanism 10 is smaller than the torque to be transmitted by the differential mechanism 5 and the left and right wheels 4RL and 4RR. Therefore, a necessary strength may be small to obtain the compact counter torque mechanism.

Further, since the first output shaft 14*a* of the counter torque mechanism 10 is not connected directly to the right wheel, but is connected to the differential input element 6, the differential input element is used for both of the wheels to obtain the compact differential torque generator between axles. Further, since the left and right wheels 4RL and 4RR are not connected to each other, a differential mechanism of bevel gear type is usable rather than a differential mechanism of complicated planetary gear type to obtain the compact differential torque generator between axles.

A method for controlling the counter torque mechanism 10 during the vehicle running is explained. When the vehicle proceeds straightly, the left and right wheels 4RL and 4RR rotate at the same speed to keep the rotational speed $\omega i$ of the input shaft zero. When a proceeding drive torque is generated by the engine 1, the proceeding drive torque is distributed by the differential mechanism 5 evenly between the left and right wheels 4RL and 4RR. The counter torque controller 21 controls the counter torque drive motor 20 to restrain a difference in rotational speed between the left and right wheels to improve a stability of straight proceeding when the difference in rotational speed is generated during the straight proceeding. At this situation, the torques applied to the left and right wheels 4RL and 4RR are sum of the proceeding drive torque by the engine 1 and the torque by the counter torque drive motor 20.

During a turn of the vehicle, a difference in turn radius between the left and right wheels causes a difference in rotational speed between the left and right wheels. For example, when the difference $\Delta\omega$ in rotational speed between the first output shaft and the second output shaft is generated during a leftward turn of the vehicle, the rotational speed ωi of the input shaft 13 is $(Zr+Zs)/Zs \times \Delta\omega$. In this situation, the torque of the counter torque drive motor 20 is controlled by the counter torque controller 21 to increase the rotational speed ωi of the input shaft so that the torque for driving the right wheel 4RR is increased and the torque for driving the left wheel 4RL is decreased. Accordingly, a moment for accelerating the turn of the vehicle is generated to improve a turn characteristic. For a further example, when an excessive turn is generated during the leftward turn of the vehicle to deteriorate the stability of the vehicle, the counter torque controller 21 controls the torque to decrease the rotational speed ωi of the input shaft. Accordingly, the torque for driving the right wheel 4RR is decreased and the torque for driving the left wheel 4RL is increased to restrain an unstable turn.

Embodiment 2

Figure 2:
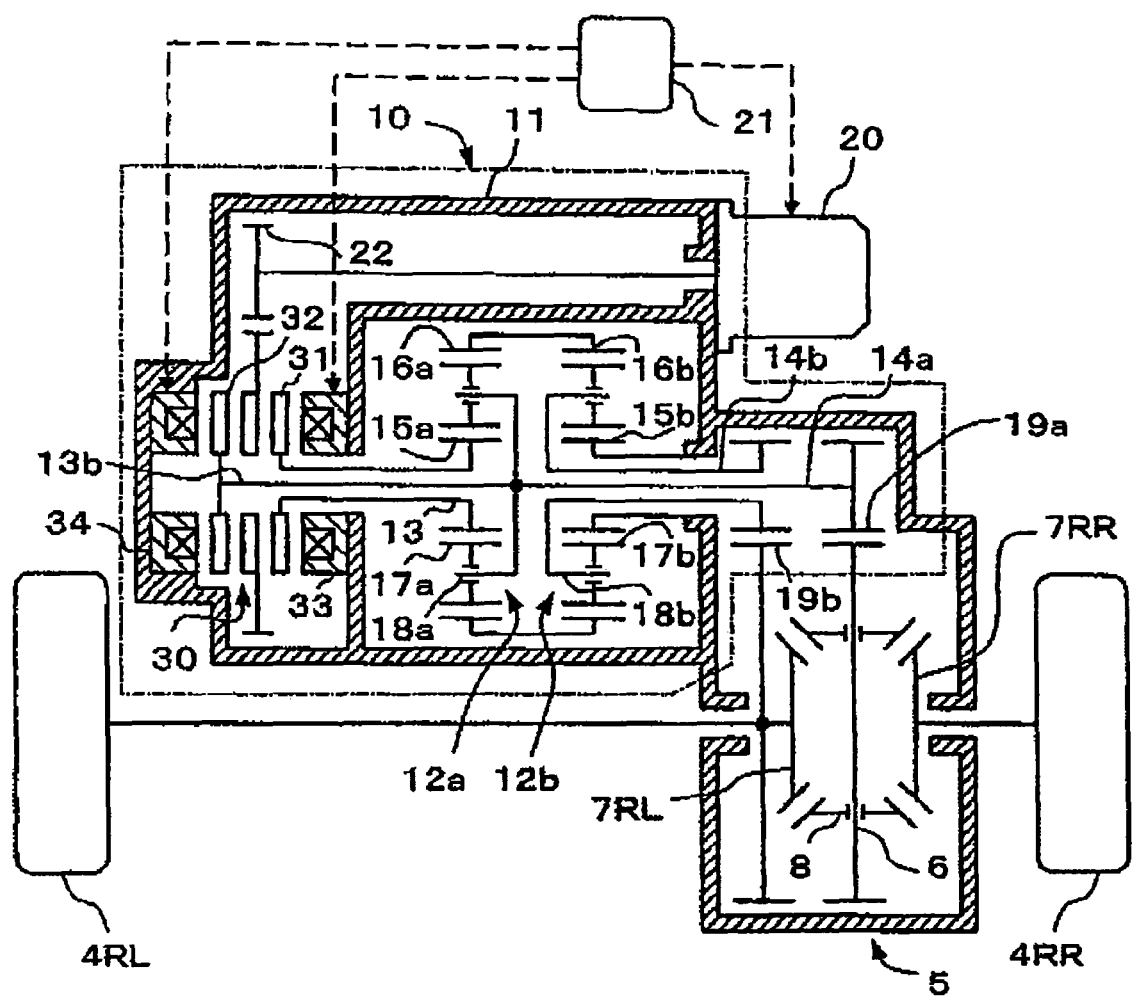
FIG. 2 is a view showing a torque generator between axles as a second embodiment of the invention.

FIG. 2 shows the second embodiment of the invention. Incidentally, the structure and operation common with those of the first embodiment are not explained.

FIG. 2 shows an example of a drive type in which front wheels are driven by the engine not shown, and rear wheels are driven by the counter torque drive motor as a vehicle drive source. The drive torque of the counter torque drive motor 20 is capable of being input to either of the input shaft 13 and a proceeding drive input shaft 13b. The counter torque drive motor 20 is connected through the reduction gear mechanism 22 and a clutch mechanism 30 to the input shaft 13 and the proceeding drive input shaft 13b. The clutch mechanism has a clutch plate 31 to transmit the torque between the reduction mechanism 22 and the input shaft 13, a coil 33 for controlling the connection of the clutch plate 31, a clutch plate 32 for transmitting the torque between the reduction mechanism 22 and the proceeding drive input shaft 13b, and a coil 34 for controlling the connection of the clutch plate 32. The counter torque controller 21 is electrically connected to the coils 33 and 34. The drive torque of the counter torque drive motor 20 is transmitted to the wheels 4Rl and 4RR as the counter torque when the clutch plate is connected, and is transmitted through the first output shaft 14a of the counter torque mechanism 10 to the wheels 4Rl and 4RR as the vehicle drive torque.

When a drive torque for the rear wheels 4RR and 4RL other than the drive torque for the front wheels generated by the engine is needed to run on a road surface of low frictional coefficient such as a snow road, the counter torque controller 21 controls the connection of the clutch plate 32 to improve the running performance of the vehicle. Further, if the counter torque is needed for the rear wheels similarly to the first embodiment, the counter torque controller 21 controls the connection of the clutch plate 31 to improve the turning performance of the vehicle.

As described above, the counter torque drive motor 20 is used as the torque generating source for driving the vehicle as well as the counter torque generating source to provide the compact differential torque generator between the axles. Further, since the torque of the torque generating source for driving the vehicle is transmitted through the counter torque mechanism 10, the counter torque mechanism 10 is commonly used to provide the compact differential torque generator between the axles.

The example applied to the vehicle in which the rear wheels are driven by the engine is shown as the first embodiment, and the example applied to the vehicle in which the front wheels are driven by the engine and the rear wheels are driven by the motor is shown as the second embodiment, but the counter torque mechanism of the invention is applicable irrespective of types of driving the vehicle.

Figure 3:
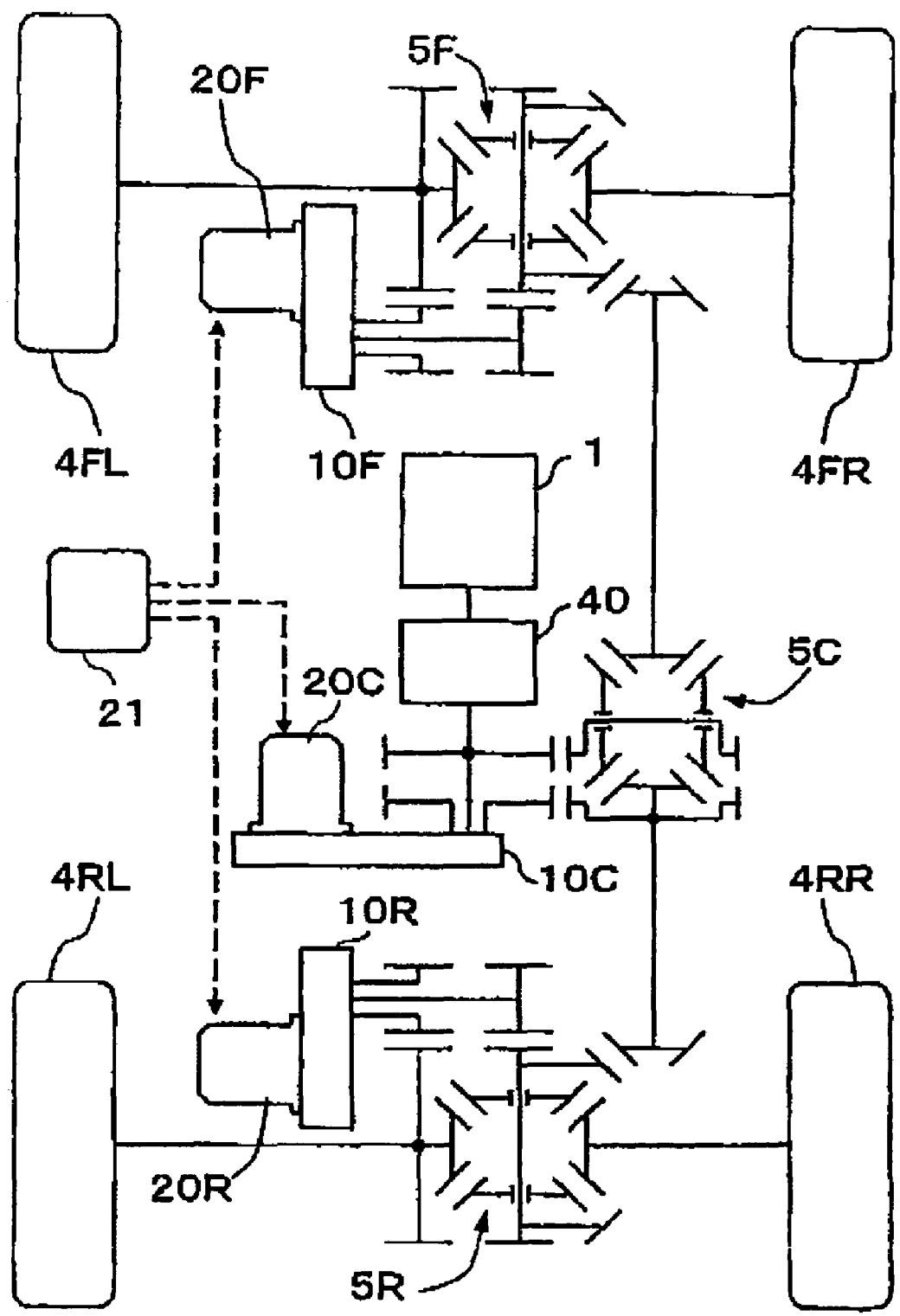
FIG. 3 is a view in which the invention is applied to another vehicle drive type.

For example, as shown in FIG. 3, it is applicable to the vehicle in which front, rear, left and right wheels are driven. The drive or brake torque of the engine and the motor 4 is transmitted to evenly the front, rear, left and right wheels 4FL, 4FR, 4RL and 4RR through the differential mechanism 5C, the differential mechanism 5F and the differential mechanism 5R. The counter torque mechanisms 10C, 10F and 10R are connected to the differential mechanism 5C, the differential mechanism 5F and the differential mechanism 5R so that the counter torques are generated by the counter torque drive motors 20C, 20F and 20R. The drive torques of the engine 1 and the motor 4 are distributed evenly among the wheels 4FL, 4FR, 4RL and 4RR when the counter torque drive motors 20C, 20F and 20R are not energized, but the torque of each of the wheels 4FL, 4FR, 4RL and 4RR is adjusted desirably by generating the torques with the motors 20C, 20F and 20R. Further, since the motor 40 can generate the torque for urging the vehicle backward as well as the torque for urging the vehicle forward, a range of the torque to be applied to the wheels 4FL, 4FR, 4RL and 4RR is enlarged in comparison with the engine 1 without the motor. As described above, the counter torque mechanism of the invention is applicable to the four-wheel-drive vehicle with the motor 40 to adjust desirably the torques of the wheels 4FL, 4FR, 4RL and 4RR to further improve the running performance.

Figure 4:
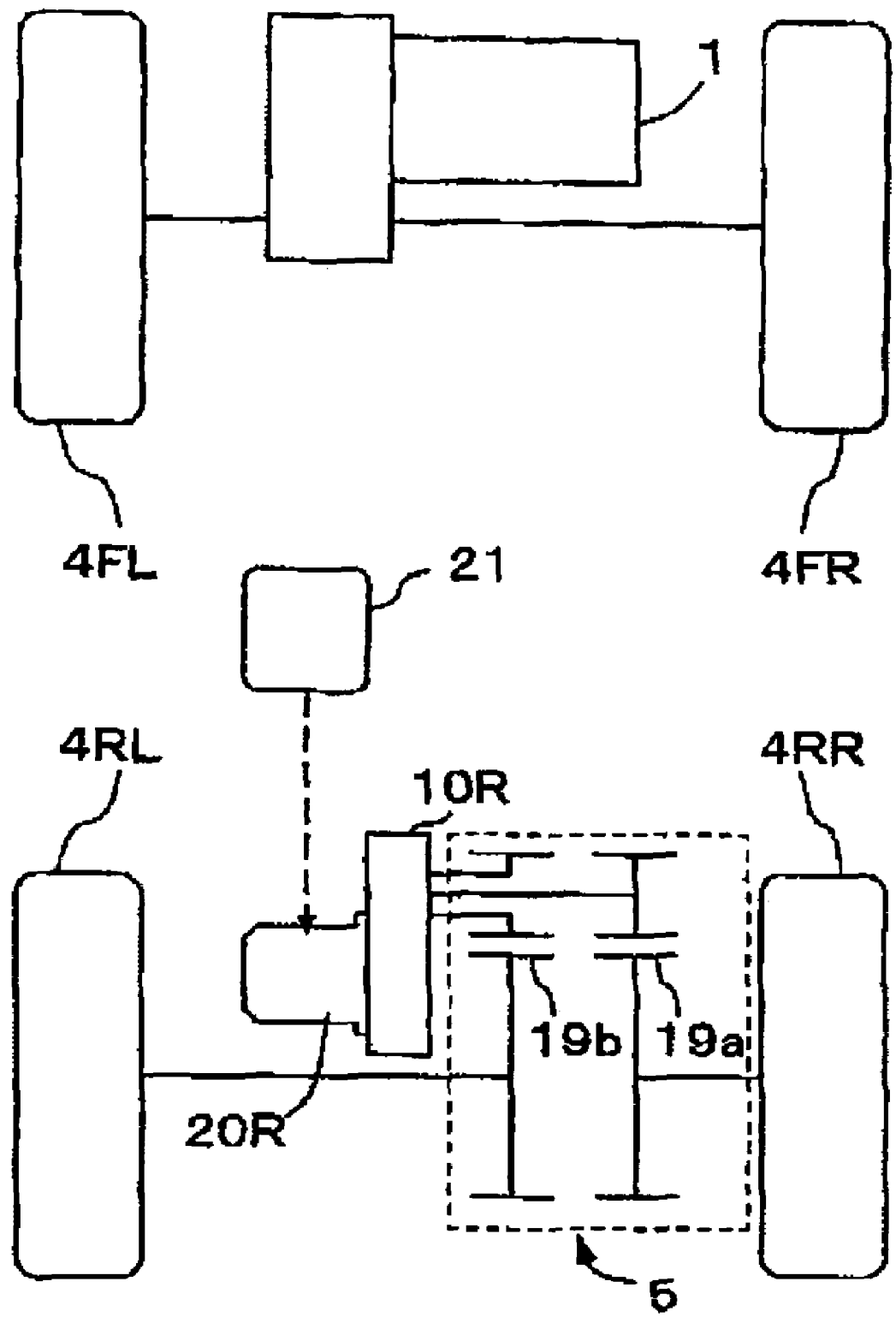
FIG. 4 a view in which the invention is applied to another vehicle drive type.

Further, for example, as shown in FIG. 4, it is applicable to a type in which the front wheels 4FL and 4FR are driven by the engine 1, and only the counter torque (parts thereof being opposite in direction to each other) is generated between the rear wheels (to be driven in respective directions opposite to each other). The counter torque mechanism operates to transmit it to the wheels 4RL and 4RR through the reduction gear mechanism 19a and 19b. The reduction gear mechanism 19a and 19b amplify the torque to make the torque transmitted by the counter torque mechanism 10 smaller than the torque transmitted to the left and right wheels 4RL and 4RR. Since the necessary strength can be decreased, the compact counter torque mechanism is obtainable. Further, since the differential for transmitting the torque to make the vehicle run is not necessary, the compact counter torque mechanism is obtainable.

Further, for example, the invention is applicable to a vehicle such as electric wheel chair including left and right wheels other than an automobile.

It should be further understood by those skilled in the art that although the foregoing description has been made on embodiments of the invention, the invention is not limited thereto and various changes and modifications may be made without departing from the spirit of the invention and the scope of the appended claims.

The invention claimed is:

1. A differential torque generator for generating a difference in magnitude between a first torque to be applied to a first vehicle wheel and a second torque to be applied to a second vehicle wheel when a vehicle is driven by a motor with rotations of the first and second vehicle wheels, comprising:
   a main differential including a first shaft to be rotationally connected to the first vehicle wheel, and a second shaft to be rotationally connected to the second vehicle wheel, wherein the first and second shafts are capable of rotating coaxially with respect to each other to allow a difference in rotational speed between the first and second shafts, and
   a supplemental differential including a first rotary member rotationally connected to the first shaft, a second rotary member rotationally connected to the second shaft and rotatable coaxially with respect to the first rotary member to allow a difference in rotational speed between the first and second rotary members, and a supplemental motor for generating a supplemental torque to cause the difference in rotational speed between the first and second rotary members in accordance with an output rotation of the supplemental motor, and to apply to the first and second rotary members respective parts of the supplemental torque opposite in direction to each other to generate the difference in magnitude between the first and second torques through the first and second rotary members and the first and second shafts, wherein a first common rotational axis of the first and second shafts is prevented from being coaxial with a second common rotational axis of the first and second rotary members so that each of the first and second shafts is prevented from extending through at least one of the first and second rotary members in a direction parallel to at least one of the first and second common rotational axes, and wherein the first rotary member extends axially into and through the second rotary member so that a portion of the first rotary member is surrounded by the second rotary member, and the first rotary member projects axially from the second rotary member so that the first and second rotary members project from the supplemental differential at the axially identical outside of the supplemental differential and are rotationally connected to respective ones of the first and second shafts at said axially identical outside of the supplemental differential.

2. The differential torque generator according to claim 1, wherein the supplemental differential includes a casing on which the first and second rotary members are supported in a rotatable manner, and a pair of planetary gear trains which are coaxial with respect to each other and each of which has a sun gear, a planet gear carrier supporting thereon at least one planet gear in a rotatable manner to engage the sun gear and a ring gear engaging the planet gear to form a first pair of the sun gears as planet elements, a second pair of the planet gear carriers as the planet elements and a third pair of the ring gears as the planet elements, the planet elements of one of the first, second and third pairs are fixed rotationally with respect to each other, one of the planet members of the other one of the first, second and third pairs is connected to the first rotary member to rotate synchronously with the first rotary member, the other one of the planet members of the other one of the first, second and third pairs is connected to the second rotary member to rotate synchronously with the second rotary member, one of the planet members of the further other one of the first, second and third pairs is prevented from rotating on the casing, and the other one of the planet members of the further other one of the first, second and third pairs is capable of being rotationally connected to the supplemental motor to be rotationally driven by the supplemental torque.

3. A differential torque generator for generating a difference in magnitude between a first torque to be applied to a first vehicle wheel and a second torque to be applied to a second vehicle wheel when a vehicle is driven by a motor with rotations of the first and second vehicle wheels, comprising:

a main differential including a first shaft to be rotationally connected to the first vehicle wheel, and a second shaft to be rotationally connected to the second vehicle wheel, wherein the first and second shafts are capable of rotating coaxially with respect to each other to allow a difference in rotational speed between the first and second shafts, and a supplemental differential including a first rotary member rotationally connected to the first shaft, a second rotary member rotationally connected to the second shaft and rotatable coaxially with respect to the first rotary member to allow a difference in rotational speed between the first and second rotary members, and a supplemental motor for generating a supplemental torque to cause the difference in rotational speed between the first and second rotary members in accordance with an output rotation of the supplemental motor, and to apply to the first and second rotary members respective parts of the supplemental torque opposite in direction to each other to generate the difference in magnitude between the first and second torques through the first and second rotary members and the first and second shafts, wherein a first common rotational axis of the first and second shafts is prevented from being coaxial with a second common rotational axis of the first and second rotary members so that each of the first and second shafts is prevented from extending through at least one of the first and second rotary members, and wherein the supplemental differential includes a third rotary member rotationally connected to one of the first and second rotary members, and a clutch for selectively connecting rotationally the supplemental motor to one of the third rotary member and the other one of the planet members of the further other one of the first, second and third pairs while releasing rotationally the supplemental motor from the other one of the third rotary member and the other one of the planet members of the further other one of the first, second and third pairs.

4. The differential torque generator according to claim 1, wherein the first rotary member and the first shaft are rotationally connected to each other in such a manner that a rotational speed of the first rotary member is higher than a rotational speed of the first shaft when the first rotary member and the first shaft rotate synchronously with respect to each other, and the second rotary member and the second shaft are rotationally connected to each other in such a manner that a rotational speed of the second rotary member is higher than a rotational speed of the second shaft when the second rotary member and the second shaft rotate synchronously with respect to each other.

5. The differential torque generator according to claim 1, wherein the main differential includes a common rotary member rotationally connected to the motor and each of the first and second shafts so that a torque generated by the motor is distributed through the common rotary member between the first and second shafts to move the vehicle, and the first rotary member is rotationally connected to the common rotary member so that one of the parts of supplemental torque is distributed through the common rotary member between the first and second shafts.

6. The differential torque generator according to claim 5, wherein the first rotary member and the common rotary member are rotationally connected to each other in such a manner that a rotational speed of the first rotary member is higher than a rotational speed of the common rotary member when the first rotary member and the common rotary member rotate synchronously with respect to each other, and the second rotary member and the second shaft are rotationally connected to each other in such a manner that a rotational speed of the second rotary member is higher than a rotational speed of the second shaft when the second rotary member and the second shaft rotate synchronously with respect to each other.

7. The differential torque generator according to claim 1, wherein the first and second common rotational axes are parallel to each other.

* * * * *